Sept. 20, 1966  H. EHRICH  3,273,404
GYROSCOPIC INSTRUMENT
Filed March 6, 1964
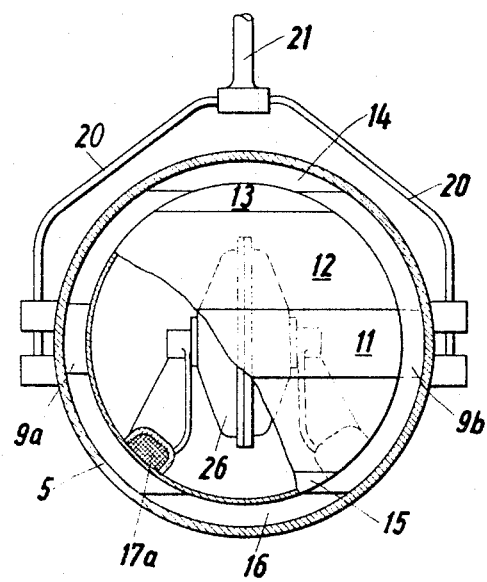
Inventor:
Hans Ehrich
B. Edward Shlesinger
Attorney

United States Patent Office 3,273,404
Patented Sept. 20, 1966

3,273,404
GYROSCOPIC INSTRUMENT
Hans Ehrich, Kiel-Schulensee, Germany, assignor to Anschutz & Co. G.m.b.H., Kiel-Wik, Germany, a limited liability company of Germany
Filed Mar. 6, 1964, Ser. No. 349,953
Claims priority, application Germany, Mar. 7, 1963, A 42,533
1 Claim. (Cl. 74—5)

My invention relates to a gyroscopic instrument of the type in which the gyroscope system comprised of at least on gyroscope and of electric driving means for spinning the same is mounted within a float which floats within a liquid filling a vessel. More particularly, my invention relates to a gyroscopic compass in which the float is a spherical hollow body, the vessel having likewise spherical shape. Instruments of that type are provided with force-producing means acting through the liquid for keeping the float in substantially centered position within the vessel, the weight of the float being slightly in excess of its buoyancy, the force-producing means being preferably formed by an inductive device energized by alternating current and adapted to exert a repelling force aiding said buoyancy in balancing the weight of the float. In an instrument of this type it is desirable to prevent any variations of the buoyancy under the influence of fluctuations of temperature. Prior to my invention it was common practice to attain this object by the provision of the gyroscopic instrument with temperature-controlling means for keeping the temperature of the liquid constant. Since the electrical energy supplied to the gyroscope system and to the inductive device are converted into heat, it was common practice to maintain the temperature of the liquid constant by cooling the outer surface of the vessel under control by a thermostat. Such thermostat-controlled cooling means, however, are voluminous and expensive.

It is the primary object of my invention to provide a gyroscopic instrument of the type indicated hereinabove in which the temperature-controlling equipment may be dispensed with.

More particularly, it is an object of my invention to provide a gyroscopic compass of the type indicated hereinabove in which the buoyancy of the spherical float immersed within the liquid is independent of the temperature of the latter and, therefore, is not subject to any variations incidental to fluctuations of the temperature.

It is a more specific object of my invention to provide an improved gyroscopic instrument of the type including a gyroscope-enclosing float immersed in a liquid in which the operating temperature prevailing within said float may vary within wide limits without adversely affecting the accuracy of operation of the instrument.

Further objects of my invention and the features of novelty will appear from the following detailed description and explanation of a preferred embodiment of my invention illustrated in the accompanying drawing. It is to be understood, however, that my invention is in no way limited or restricted to such details but is capable of numerous modifications within the scope of the appended claims.

The drawing illustrates an elevation of a gyroscopic compass constructed in accordance with the invention, partly shown in section, parts of the spherical float being broken away to expose the gyroscope system to view.

A spherical hollow float 12 encloses a gyroscope system 26 comprised of at least one gyroscope and of electric driving means for spinning said gyroscope. The float 12 is surrounded by a spherical vessel 5 connected by supporting rods 20 with a vertical shaft 21 carrying the cardan and being mounted for rotation and universal movement by means including a set of gimbal rings. The shaft 21 is disposed above the vessel 5 and its axis intersects the center of the spherical vessel. The space between the vessel 5 and the float 12 is filled by an electrically conductive liquid preferably consisting of a mixture of water and glycerine to which a small quantity of a soluble agent has been added for rendering the mixture electrically conductive. The weight of the float 12 and of the elements mounted therein is slightly in excess of its buoyancy. Therefore, forces must be exerted in upward direction upon the float 12 for aiding the buoyancy in keeping the float in floating condition, preferably in centered relationship with respect to the vessel 5. In the embodiment shown, a coil 17a is mounted in the lower part of the float 12, the axis of the coil being disposed vertically and intersecting the center of the float. Moreover, the vessel 5 or at least the portion thereof located in the region adjacent to the coil 17a consists of a conductive material, such as metal. The coil 17a is energized by an alternating current. It will induce a current in the conductive portion of the vessel exerting a repelling force on the float in upward direction. This inductive device is so dimensioned and arranged that it will aid the buoyancy to the degree just sufficient to keep the float substantially in centered position.

Means are provided for supplying an alternating current from a source located outside the vessel 5 through the liquid to the coil 17a and to the gyroscopic system 26 mounted within the float. This means comprises conductive portions 11, 13 and 15 of the surface of the float, the remaining portions thereof being of a non-conductive nature, and conductive portions 9a, 9b, 14 and 16 of the internal surface of the vessel 5, the remainder of such internal surface being of a non-conductive nature. The conductive surfaces represent pairs of opposed electrodes forming part of a circuit between the source of current and the current consuming elements 17a and 26 disposed within the float.

The gyroscopic instrument described hereinabove represents a gyroscopic compass of a known type which has been described in U.S. Patent 1,589,039 to H. Anschutz-Kaempfe, more particularly with reference to FIGS. 7 and 8 thereof and in numerous publications including the book "Der Anschütz Kreiselkompass" by Dr. H. Meldau edited by Arthur Geist, Bremen, 1936.

For the purpose of my invention I make the float 12 and, more particularly, the outer walls thereof of a material having substantially the same thermal coefficient of expansion as the liquid filling the space between the float and the vessel 5. The liquid described hereinabove has a cubic coefficient of thermal expansion of about $200 \cdot 10^{-6}$. With this liquid I prefer to make the external wall of the spherical hollow float 5 of a plastic having a linear coefficient of expansion from $60 \cdot 10^{-6}$ to $70 \cdot 10^{-6}$ which corresponds to a cubic coefficient of expansion of from $180 \cdot 10^{-6}$ to $210 \cdot 10^{-6}$. Suitable plastics are an epoxy-resin available on the German market under the trade name "Araldit" or a plastic available on the German market under the trade name "Plexiglas" or a condensation product of phenol and formaldehyde or the like. If desired, I may increase or reduce the coefficient of expansion of the liquid by the addition of suitable liquid or soluble solid substances so as to substantially equal the thermal coefficient of expansion of the float 12. More particularly, the coefficient of thermal expansion of the liquid may be increased or reduced by variation of the ratio of mixture of water and glycerine. If desired, the material of the float need not be a homogeneous material but may be composed of various materials forming different portions of the external wall of the float. Thus, the upper portion of the float may be formed by a material differing from the lower portion of the float. It is the resulting effective total coefficient of expansion which must substantially equal that of the liquid.

The plastics may contain a suitable filler increasing the thermal conductivity. A high thermal conductivity is desirable for the purpose of reducing the time which will expire upon initiation of the operation of the instrument until a substantial constancy of the temperatures of the float 12 and the liquid will have been reached.

Should it be found that the temperature prevailing within the float 12 will exceed a desirable limit upon continued operation of the instrument, means must be provided for cooling the outside surface of the vessel 5, for instance air-cooling means including a fan producing a flow of cold air in contact with the surface of vessel 5 or liquid-cooling means including a liquid-containing tank filled to the iner gimbal ring and containing cooling liquid in which the vessel 5 is immersed. In either case, however, it will not be necessary to provide means for controlling the cooling effect in dependence on the resulting temperature, since fluctuations of the temperature of the float 12 will not adversely affect the buoyancy of the float and the consequent concentricity of the float and the spherical vessel 5.

It will be obvious to those skilled in the art to which the invention appertains that the same may be incorporated in several different constructions. The accompanying drawing, therefore, is submitted merely as showing the preferred exemplification of the invention. More particularly, my invention is applicable to gyroscopic instruments in which the force-producing means are formed by a suitable suspension, for instance by a flexible electrical conductor serving the dual purpose of suspending the float in centered condition and of supplying the electrical energy thereto. Within an instrument of that type the liquid need not be conductive.

What I claim is:

A gyroscope instrument comprising a vessel, an electrically conductive liquid filling said vessel, a float immersed in said liquid, at least one gyroscope mounted within said float, electric driving means in said float for spinning said gyroscope, means including electrode faces on the inside of said vessel and on the outside of said float for the supply of the electrical energy to said electric driving means, said float consisting of a mixture of a synthetic plastic material with a filler, said filler having a thermal conductivity higher than that of said plastic material.

References Cited by the Examiner

UNITED STATES PATENTS

| | | | |
|---|---|---|---|
| 1,589,039 | 6/1926 | Anschutz-Kaempfe | 74—5.46 X |
| 2,887,885 | 5/1959 | Lackey et al. | 74—5.5 |
| 2,984,727 | 5/1961 | Lemmerman et al. | 74—5.5 X |
| 3,127,776 | 4/1964 | Tarasevich et al. | 74—5 |

FRED C. MATTERN, Jr., *Primary Examiner.*

BROUGHTON G. DURHAM, MILTON KAUFMAN, *Examiners.*

T. W. SHEAR, P. W. SULLIVAN, *Assistant Examiners.*